(12) United States Patent
Sawada et al.

(10) Patent No.: US 9,550,596 B2
(45) Date of Patent: Jan. 24, 2017

(54) METHOD OF SEALING CONTAINERS AND LIDS BY MELT ADHESION BY LASER

(71) Applicant: TOYO SEIKAN GROUP HOLDINGS, LTD., Shinagawa-ku, Tokyo (JP)

(72) Inventors: Makoto Sawada, Yokohama (JP); Kiyotaka Shinozaki, Yokohama (JP); Yoshiaki Shinagawa, Yokohama (JP); Jun Yamasaki, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/387,063

(22) PCT Filed: Mar. 8, 2013

(86) PCT No.: PCT/JP2013/056473
§ 371 (c)(1),
(2) Date: Sep. 22, 2014

(87) PCT Pub. No.: WO2013/146190
PCT Pub. Date: Oct. 3, 2013

(65) Prior Publication Data
US 2015/0083302 A1 Mar. 26, 2015

(30) Foreign Application Priority Data
Mar. 29, 2012 (JP) ................... 2012-077905

(51) Int. Cl.
*B65B 7/00* (2006.01)
*B29C 65/00* (2006.01)
(Continued)

(52) U.S. Cl.
CPC ........... *B65B 51/10* (2013.01); *B29C 65/1635* (2013.01); *B29C 65/1654* (2013.01);
(Continued)

(58) Field of Classification Search
CPC .. B29C 65/16; B29C 65/1629; B29C 65/1635; B29C 65/1654; B29C 65/1677; B29C 66/71; B29C 66/65; B29C 66/1122; B29C 66/5221; B29C 66/73921
(Continued)

(56) References Cited

U.S. PATENT DOCUMENTS 3,769,117 A * 10/1973 Bowen ............. B29C 66/93451
156/272.8
2003/0213552 A1* 11/2003 Chen ................... B23K 26/0732
156/272.8
(Continued)

FOREIGN PATENT DOCUMENTS

EP 1366890 A1 12/2003
JP 2000-128166 A 5/2000
(Continued)

OTHER PUBLICATIONS

International Search Report for PCT/JP2013/056473 dated Jun. 18, 2013 [PCT/ISA/210].
(Continued)

*Primary Examiner* — Philip Tucker
*Assistant Examiner* — Brian R Slawski
(74) *Attorney, Agent, or Firm* — Sughrue Mion, PLLC

(57) ABSTRACT

A method of sealing a container and a lid by melt adhesion by laser. Either the container or the lid has a thermoplastic resin that permits the laser beam to transmit through and the other one has a resin composition of the thermoplastic resin containing a heat-generating substance. Further, the laser beam applies a rectangular beam having a uniform intensity distribution. The upper-limit of temperature is not lower than a melting point of the thermoplastic resin but lower than a thermal decomposition start temperature thereof in the melt adhesion interface between the container and the lid, (Continued)

and the temperature reaches the upper-limit in a heating time $t$ (msec) represented by the following formula (1), $$t \text{ (msec)} = L/S \tag{1}$$

where L is the length (mm) of the rectangular beam in the scanning direction, and S is the rate of laser scanning (mm/msec) of not higher than 1.65 mm/msec.

3 Claims, 2 Drawing Sheets

(51) Int. Cl.

| | | |
|---|---|---|
| B32B 37/00 | (2006.01) | |
| B32B 38/10 | (2006.01) | |
| C08J 5/00 | (2006.01) | |
| B65D 39/00 | (2006.01) | |
| B65D 41/00 | (2006.01) | |
| B65D 43/00 | (2006.01) | |
| B65D 47/00 | (2006.01) | |
| B65D 51/00 | (2006.01) | |
| B23K 26/00 | (2014.01) | |
| B65B 51/10 | (2006.01) | |
| B65B 7/28 | (2006.01) | |
| B29C 65/16 | (2006.01) | |
| B32B 38/00 | (2006.01) | |
| B29K 507/04 | (2006.01) | |
| B29L 31/00 | (2006.01) | |

(52) U.S. Cl.
CPC ...... *B29C 65/1677* (2013.01); *B29C 66/1312* (2013.01); *B29C 66/542* (2013.01); *B29C 66/545* (2013.01); *B29C 66/65* (2013.01); *B29C 66/733* (2013.01); *B29C 66/73921* (2013.01); *B29C 66/91411* (2013.01); *B29C 66/91443* (2013.01); *B29C 66/91951* (2013.01); *B29C 66/934* (2013.01); *B29C 66/939* (2013.01); *B32B 38/0008* (2013.01); *B65B 7/28* (2013.01); *B29C 65/1616* (2013.01); *B29C 66/71* (2013.01); *B29C 66/8322* (2013.01); *B29K 2507/04* (2013.01); *B29K 2995/0027* (2013.01); *B29L 2031/716* (2013.01)

(58) Field of Classification Search
USPC .......... 156/60, 69, 272.2, 272.8, 275.1, 292, 156/308.2, 308.4, 309.6; 215/200, 232; 219/121.6, 121.63, 121.64
See application file for complete search history.

(56) References Cited

U.S. PATENT DOCUMENTS

| | | | |
|---|---|---|---|
| 2009/0126869 A1 | 5/2009 | Asada et al. | |
| 2009/0239081 A1* | 9/2009 | Habas | B29C 65/1635 |
| | | | 428/412 |
| 2010/0096388 A1 | 4/2010 | Kobayashi et al. | |

FOREIGN PATENT DOCUMENTS

| | | | |
|---|---|---|---|
| JP | 2004-167808 A | | 6/2004 |
| JP | 2008-207358 A | | 9/2008 |
| JP | 2009-119832 A | | 6/2009 |
| JP | 2010-173168 A | | 8/2010 |
| JP | 2010-184490 A | | 8/2010 |
| JP | 2011-020175 A | | 2/2011 |
| JP | 2011051627 A | * | 3/2011 |
| JP | 2011-207056 A | | 10/2011 |

OTHER PUBLICATIONS

Communication dated Nov. 9, 2015, issued by the European Patent Office in corresponding European Application No. 13767876.9.

* cited by examiner (A): POOR SEALING
(B): SEALABLE RANGE
(C): FOAM
(D): TEMPERATURE DIFFERENCE

METHOD OF SEALING CONTAINERS AND LIDS BY MELT ADHESION BY LASER

CROSS REFERENCE TO RELATED APPLICATIONS

This application is a National Stage of International Application No. PCT/JP2013/056473 filed Mar. 8, 2013, claiming priority based on Japanese Patent Application No. 2012-077905 filed Mar. 29, 2012, the contents of all of which are incorporated herein by reference in their entirety.

TECHNICAL FIELD

This invention relates to a method of sealing containers and lids made from a thermoplastic resin by melt adhesion by laser. More specifically, the invention relates to a method of melt adhesion by laser capable of reliably sealing the containers and the lids in short periods of time.

BACKGROUND ART

As the method of sealing the containers with the lids, there can be, usually, exemplified a method of adhesion by applying an adhesive to the contacting surfaces of the containers and the lids, and an art of forming the contacting surfaces of the containers and the lids with a heat-sealable resin, and attaining the sealing by melt-adhering the heat-sealable resin. The melt adhesion by heat-sealing is a simple method and has, usually, been widely used.

However, the melt adhesion by heat-sealing requires extended periods of time for the step of melt adhesion and for the subsequent step of cooling, and is not satisfactory from the standpoint of productivity. Further, The heat-sealing system, usually, uses a generally employed heat-seal bar, and makes it necessary to conduct the heat from the outer surface of the melt-adhering portion onto the sealing surface requiring, therefore, an extended period of time for conducting the heat when thick containers are handled. To prevent a decrease in the productivity, therefore, limitation is imposed on the thickness arousing, therefore, a problem in that only a low degree of freedom is allowed for designing the container and lid shapes. Further, a predetermined period of time is required until the heat-sealed portion is cooled and is completely sealed. Therefore, when the content having a spontaneous pressure is contained or when the content is hot-filled, the gas in the head space that is expanded due to the heat of sealing might escapes through the sealing portion in a molten state, and the sealing might peel off.

On the other hand, as the method of melt-adhering the members of packing bodies such as containers and lids, there have heretofore been known a melt adhesion by a laser. A patent document 1, for example, proposes an art of melt-adhering a bottom lid and an upper lid to the container body as a unitary structure by melt adhesion by laser. Upon melt-adhering the parts of the packing bodies by melt adhesion by laser, the sealing surfaces can be melt-adhered without much limited by the thickness of the members and, therefore, the time required for the melt adhesion is shortened as compared to the case of the heat-sealing.

The present inventors have also proposed a method of melt adhesion by constituting a self-pressing mechanism capable of pressing the members of the packing bodies such as containers and lids onto each other, enabling the melt adhesion by laser to be attained without the need of fixing the melt-adhering portions by using the external pressing mechanism and making it possible to seal the members of even relatively thick packing bodies maintaining a high speed and stability (patent document 2).

PRIOR ART DOCUMENTS

Patent Documents

Patent document 1: JP-A-2000-128166
Patent document 2: JP-A-2008-207358

OUTLINE OF THE INVENTION

Problems that the Invention is to Solve

As described above, the containers and lids are sealed by melt adhesion by laser in shorter periods of time and more efficiently than those based on the conventional melt adhesion by heat-sealing. However, even when the containers and the lids are to be sealed by melt adhesion by laser, it is required to melt-adhere the containers and the lids in short periods of time to further improve the efficiency of production.

To further improve the productivity by melt adhesion by laser, it can be contrived to increase the rate of laser scanning and to increase the laser output to reliably attain the melt adhesion with the irradiation in short periods of time. However, the melt adhesion by laser is greatly affected by the properties of the resin that is to be heated. Therefore, a simple increase in the laser output generates heat only locally and excessively and, therefore, causes the resin to be thermally decomposed resulting in the occurrence of such a problem as foaming in the resin and, therefore, making it difficult to attain a reliable sealing in a short period of time.

It is, therefore, an object of the present invention to provide a method of melt adhesion by laser capable of reliably sealing the containers and the lids in short periods of time without generating foaming or the like in the resin.

Means for Solving the Problems

According to the present invention, there is provided a method of sealing a container and a lid by melt adhesion by laser, wherein either the container or the lid comprises a thermoplastic resin that permits the laser beam to transmit through and the other one comprises a resin composition of the thermoplastic resin containing a heat-generating substance that generates heat upon absorbing the laser beam, the laser beam is capable of applying a rectangular beam having a uniform intensity distribution, the upper-limit of temperature that is elevated by the application of laser beam lies in a range of not lower than a melting point of the thermoplastic resin but lower than a thermal decomposition start temperature thereof in the melt adhesion interface between the container and the lid, and the temperature reaches the upper-limit in a heating time t (msec) represented by the following formula (1), $$t \text{ (msec)} = L/S \qquad (1)$$

wherein L is the length (mm) of the rectangular beam in the scanning direction, and S is the rate of laser scanning (mm/msec) of not higher than 1.65 mm/msec.

In the sealing method of the present invention, it is desired that:

1. The thermoplastic resin is any one of a polystyrene styrene resin, an olefin resin or a polyester resin;

2. The container has a flange portion and is melt-adhered to the lid by laser at the flange portion;

3. The container comprises a thermoplastic resin that permits laser beam to transmit through, and the lid comprises a resin composition of the thermoplastic resin containing a heat-generating substance that generates heat upon absorbing the laser beam; and 4. The rate of laser scanning is 1.40 to 1.65 mm/msec.

Effects of the Invention

The sealing method of the present invention uses a laser beam (hereinafter often referred to simply as "rectangular laser beam") capable of applying a rectangular beam of a uniform intensity distribution making it possible to apply the laser beam more efficiently than that of a general circular spot laser and, therefore, to reliably attain the melt adhesion in a short period of time without causing the resin to be excessively heated.

That is, when the container and the lid are to be melt-adhered together by laser, the laser beam must be scanned circularly along the opening portion of the container. Therefore, the invention uses a rectangular laser beam having a length L in the scanning direction which makes it possible to increase the rate of laser scanning without wasting energy as compared to increasing the diameter of the general spot laser and, therefore, to seal the container and the lid by melt adhesion by laser maintaining a maximum scanning rate of as high as 1.65 mm/sec.

In the invention, further, the upper-limit temperature is set to lie in a range of not lower than a melting point of the thermoplastic resin that permits the laser beam to pass through (hereinafter often "laser beam-transmitting thermoplastic resin") but lower than a thermal decomposition start temperature thereof in the melt adhesion interface between the thermoplastic resin and the resin composition of the thermoplastic resin containing a heat-generating substance that generates heat upon absorbing the laser beam (hereinafter "laser beam-absorbing resin composition"). This makes it possible to reliably melt-adhere the container and the lid together within a short period of time and reliably without causing the laser beam-absorbing laser composition to be foamed.

In the invention, further, the laser beam-transmitting thermoplastic resin and the laser beam-absorbing resin composition use the thermoplastic resin of the same kind enabling the melt adhesion to be effectively executed in the interface thereof.

MODE FOR CARRYING OUT THE INVENTION

The melt adhesion by laser is based on that a heat-generating substance contained in the laser beam-absorbing thermoplastic resin composition absorbs the laser beam and generates the heat. The heat is then conducted to melt the thermoplastic resin causing the sealing interface to be melt-adhered. Here, however, the heat is conducted requiring a predetermined period of time and causes a delay in elevating the temperature of the laser beam-transmitting thermoplastic resin. Therefore, if it is attempted to increase the laser output in order to simply shorten the time for melt adhesion, then the laser beam-absorbing thermoplastic resin composition is over-heated and is foamed imposing limitation on shortening the time for melt adhesion.

According to the sealing method by melt adhesion by laser of the present invention, an important feature resides in the use of a rectangular laser beam having a predetermined length L in the scanning direction to reliably attain the melt adhesion in the sealing interface within short periods of time without causing the laser beam-absorbing thermoplastic resin composition to be overheated, and in elevating the temperature in the sealing interface between the container and the lid at the time of melt adhesion by laser to lie in a range which is not lower than a melting point of the thermoplastic resin constituting the container and the lid but is lower than a thermal decomposition start temperature thereof.

Figure 1:
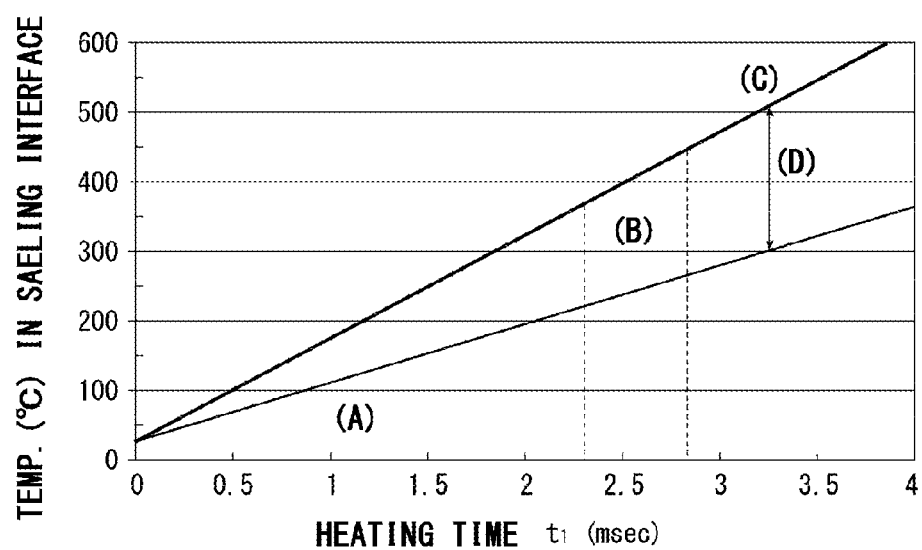
FIG. 1 is a diagram showing a relationship between the temperature in the sealing interface and the heating time of when the container is made from a polypropylene and the lid is made from a laser beam-absorbing thermoplastic resin composition of the polypropylene that contains 1000 ppm of carbon black.

That is, the laser beam-transmitting thermoplastic resin and the laser beam-absorbing thermoplastic resin composition forming the container and the lid, are tentatively measured for their temperatures by changing the laser application times in, for example, three stages depending on the laser output that is used, and the temperature coefficients are calculated to thereby calculate the resin temperatures depending on the laser application times. Namely, as shown in FIG. 1, the heating time t1 (msec) can be found that is needed for the laser beam-transmitting thermoplastic resin and the laser beam-absorbing thermoplastic resin composition to be heated to a temperature of not lower than the melting point of the thermoplastic resin and not lower than the thermal decomposition start temperature thereof. The heating time is the time in which the laser beam is applied per a unit length (mm) in the direction of laser scanning. When a rectangular laser beam having a length L (mm) in the direction of laser scanning is used, therefore, the heating time t1 is represented by the formula (1) mentioned earlier.

According to the present invention, therefore, the length L of the rectangular laser beam or the rate of scanning thereof is so set that the heating time t represented by the above formula (1) becomes the above heating time t1 making it possible to reliably melt-adhere the container and the lid together within a short period of time without causing the laser beam-absorbing resin composition to be foamed.

(Laser Beam-Transmitting Thermoplastic Resin)

In the invention, the laser beam-transmitting thermoplastic resin is, desirably, a thermoplastic resin having a laser beam transmission factor of not less than 70% and, specifically, not less than 80%. The laser transmission factor can be found by measuring, using a spectrophotometer, the transmission factor for the light corresponding to the wavelength of the laser beam that is used.

Despite the same thermoplastic resin is used, the laser beam transmission factor varies depending on its thickness. In the invention, therefore, the transmission factor of not less than 70% is that of when the thickness lies within a range that will be described later.

As the thermoplastic resin, there can be desirably used styrene resins such as shock resistant polystyrene; olefin resins such as low-, intermediate- and high-density polyethylenes, isotactic polypropylene, propylene-ethylene copolymer, polybutene-1, ethylene.propylene copolymer, ethylene butene-1 copolymer, propylene.butene-1 copolymer and ethylene.propylene.butene-1 copolymer; and polyester resins such as polyethylene terephthalate, that have heretofore been used for the packing containers. Specifically, from the standpoint of that the thermoplastic resin must be easily melted by the heat generated in the laser beam-absorbing resin composition, it is desired to use a thermoplastic resin having a melting point of not higher than 250° C. for it can be easily melted and, particularly, to use the polyethylene or the polypropylene.

(Laser Beam-Absorbing Resin Composition)

In the present invention, it is desired that the laser beam-absorbing resin composition uses the same thermoplastic resin as the thermoplastic resin used for the above-mentioned laser beam-transmitting thermoplastic resin from the standpoint of melt adhesion by laser bean.

In the laser beam-absorbing resin composition of the invention, it is desired that the resin composition homogeneously contains the heat-generating substance from such a standpoint that the laser beam-transmitting thermoplastic resin can be easily melted in the sealing interface. As the heat-generating substance, there can be exemplified an oxygen absorber such as iron powder, and a pigment such as carbon black.

The heat-generating substance is, usually, used in an amount of 0.01 to 0.30 parts by weight and, specifically, 0.05 to 0.15 parts by weight per 100 parts by weight of the thermoplastic resin though it may vary depending on the kind of the heat-generating substance.

(Container and Lid)

The method of sealing the container and the lid of the present invention is based on the melt adhesion by laser beam, and is not limited by the shape of the container or the lid, and can be applied to various sorts of combinations of the containers and the lids.

In the invention, either the container or the lid is made from the laser beam-transmitting thermoplastic resin and the other one is made from the laser beam-absorbing thermoplastic composition. Though one of them may be made from the laser beam-absorbing thermoplastic resin composition, it is desired that the lid is, specifically, made from the laser beam-absorbing thermoplastic resin composition.

As the container, there can be concretely exemplified cups and trays made from a single-layer or multi-layer sheet material by the heat forming such as vacuum forming, pressed air forming or plug assist forming, as well as cups having bottom formed by the draw-forming. Specifically desirably, however, the container is a cup having a flange portion. In this case, the container and the lid are contacted together at the flange portion by applying a pressure of not less than 550 kpa, and are melt-adhered together by being irradiated with the laser beam.

The lid may assume various shapes depending on the shape of the container which may be the cup or the tray, and may be in the form of a flat surface lid, a dented lid with its center dented inward, or over-capped lid having a skirt portion hanging down from the outer circumferential end of the top plate. Namely, the shape may be suitably changed to meet the portion of the container to which it comes in contact.

Here, only the melt-adhering portion of the container or the lid may be formed by using the laser beam-absorbing thermoplastic resin composition. For instance, only the flange portion of the container may be formed by using the laser beam-absorbing thermoplastic resin composition, while the body portion and bottom portion of the container may be formed by using the laser beam-transmitting thermoplastic resin containing no heat-generating member or may have a multilayered structure. Or only the flange portion of the lid may be formed by using the laser beam-absorbing thermoplastic resin composition and the central portion thereof may be formed by using the laser beam-transmitting thermoplastic resin.

In the invention it is desired that the thicknesses of the container and the lid at the melt-adhered portions are in a range of 0.1 to 2.0 mm and, specifically, 0.5 to 1.2 mm in the portions made from the laser beam-transmitting thermoplastic resin. If the thickness of the portion made from the laser beam-transmitting thermoplastic resin is smaller than the above range, it becomes difficult to reliably conduct the melt adhesion as compared to if the thickness thereof is in the above range. If the thickness thereof is larger than the above range, on the other hand, it becomes difficult to let the laser beam reach the portion made from the laser beam-absorbing thermoplastic resin composition under ordinary condition and makes it difficult to reliably conduct the melt adhesion, either, as compared to if the thickness is in the above range.

It is, further, desired that the portion comprising the laser beam-absorbing thermoplastic resin composition has a thickness in a range of 0.1 to 2.0 mm and, specifically, 0.5 to 1.2 mm. If the thickness of the portion comprising the laser-beam absorbing thermoplastic resin composition is smaller than the above range, then it becomes difficult to reliably conduct the melt adhesion as compared to if the thickness is in the above range. Besides, even if the thickness is increased in excess of the above range, there only results in disadvantage in economy.

(Sealing Method)

In the invention, the above-mentioned portion where the container and the lid are contacting together is irradiated with the laser beam from the side of the member that comprises the laser beam-transmitting thermoplastic resin so that the laser beam-absorbing thermoplastic resin composition generates the heat to thereby melt the laser beam-transmitting thermoplastic resin and, therefore, to melt-adhere the container and the lid together at their contacting surfaces.

In the sealing method of the present invention, after the container is filled with the content, the container or the laser oscillator is moved (turned) along the shape of the portion where the container and the lid are to be sealed together so as to scan the portion where the container and the lid are to be sealed together with the laser beam.

In irradiating the laser beam, it is important that the contacting surfaces of the container and the lid are closely fitted together so as to efficiently melt-adhere the two together. Namely, as shown in FIGS. 2 and 3, the two are closely fitted together by using a jig for pressing and fixing them together, or the two are closely fitted together by forming the container and the lid in such sizes and shapes as to attain a positional relationship that enables the container and the lid to be pressed onto each other at their contacting surfaces.

Figure 2:
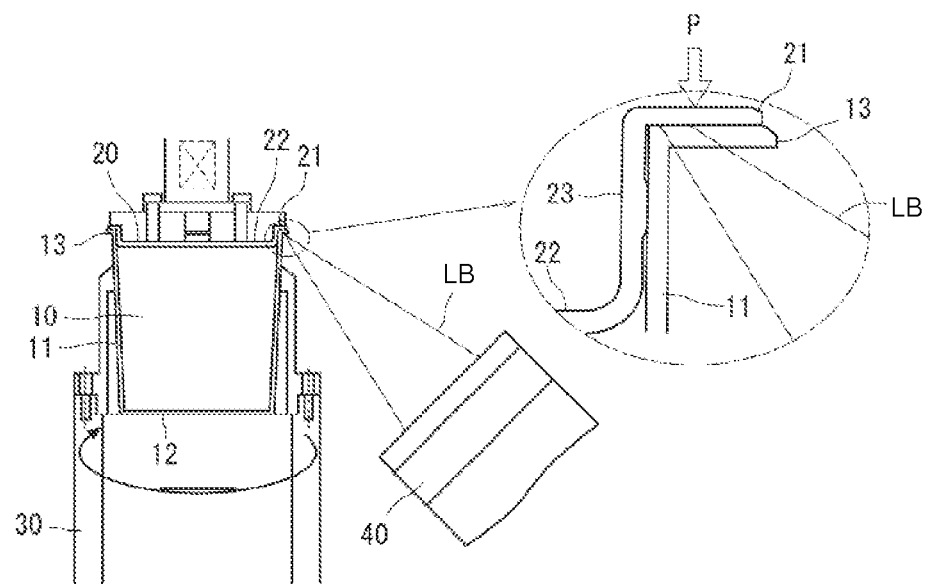
FIG. 2 is a view illustrating the melt adhesion by laser of the container and the lid at a flange portion.
Figure 3:
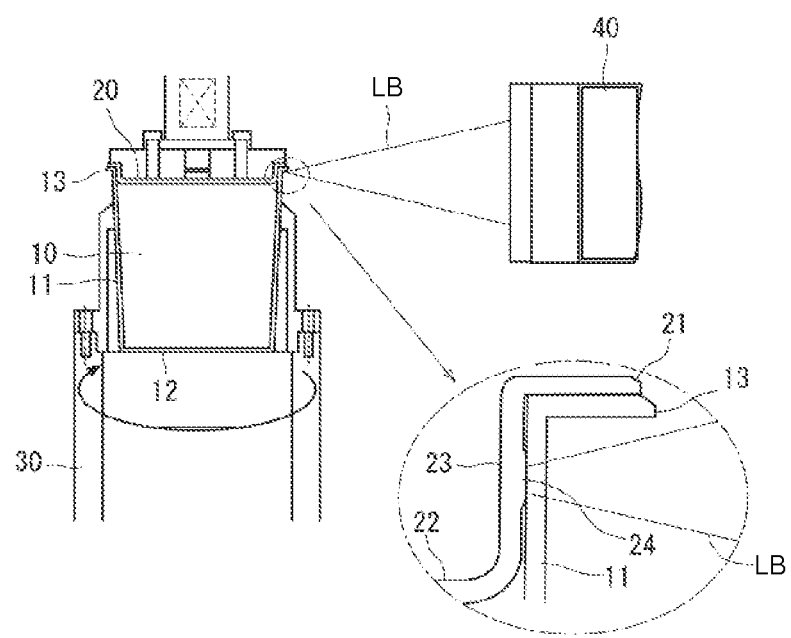
FIG. 3 is a view illustrating the melt adhesion by laser of the container and the lid on the side surfaces thereof.

FIG. 2 is a view illustrating a sealing method of melt-adhering the container of the laser beam-transmitting thermoplastic resin and the lid of the laser beam-absorbing thermoplastic resin composition together at the flange portion. Here, the container comprises a cup 10 having a body portion 11, a bottom portion 12 and a flange portion 13, and the lid comprises a formed lid 20 of a dented shape having a central portion 22 that is concave inward on the inside of a circumferential edge 21 that corresponds to the flange portion of the container.

The cup 10 is installed and fixed on a turntable 30, and the formed lid 20 is so installed that the circumferential edge 21 of the formed lid 20 is positioned on the flange portion 13 of the cup 10. A load P is applied from the upper side of the formed lid 20 to closely fit together the flange portion 13 of the cup 10 and the circumferential edge 21 of the formed lid 20 at their contacting surfaces.

Next, the container and the lid are irradiated with the laser beam LB from a lower tilted direction thereof accompanying the rotation of the turntable 30 to melt-adhere together the contacting surfaces of the cup 10 and the formed lid 20 to accomplish the sealing.

The direction in which the laser beam is applied is not limited to the example of FIG. 2 only; i.e., the laser beam can be applied from any direction depending upon the resins constituting the container and the lid or upon the portions to be melt-adhered.

Referring, for example, to FIG. 3, a protuberance 24 is formed along the side surface 23 of the formed lid 20 of the dented shape, and the press-fitted portion is formed with the inner surface of the cup 10 being pushed by the protuberance 24. In this case, the laser beam can be applied from the side of the container and the lid. In the example of FIG. 2, further, the container may be made from the laser beam-absorbing thermoplastic resin composition and the lid may be made from the laser beam-transmitting thermoplastic resin, and the laser beam LB may be applied from the upper side. In this case, the member on the side from where the laser beam is applied comprises the laser beam-transmitting thermoplastic resin, as a matter of course.

As the laser for use in the present invention, there can be used a laser that has heretofore been used for melt adhesion by laser, such as gas laser, solid laser or semiconductor laser. Among them, the semiconductor laser can be favorably used from the standpoint of small-sized facility and cost.

It is desired that the laser oscillator has an output in a range of 100 to 500 W and, specifically, 200 to 350 W. To attain the melt adhesion at high speeds, it can be contrived to increase the laser output which, however, is likely to cause the laser beam-absorbing thermoplastic resin composition to be foamed due to thermal decomposition as described earlier. In the present invention, therefore, a significant meaning resides in that the melt adhesion is realized at high speeds while suppressing the output to lie in a range that has heretofore been employed for the melt adhesion by laser.

In a commercial sense, the laser that is to be used is determined depending on the transmission factor of the resin, properties of the substance that generates heat upon absorbing the laser beam, output of the laser oscillator, cost and safety.

In the invention, it is important to use the laser beam which is a rectangular beam, i.e., a laser beam having a rectangular shape in cross section at right angles with the axial direction of the laser beam. This makes it possible to realize the sealing by melt-adhering the container and the lid together by laser in a short period of time. As for the size of the rectangular beam as described above, the length of the rectangular laser beam in the scanning direction can be determined depending on the thermoplastic resin that is used, heat-generating substance and its amount, and the rate of scanning.

It is, further, desired that the laser beam has a focal distance in a range of 50 to 250 mm and, specifically, 100 to 200 mm.

In the invention, from the standpoint of attaining the melt adhesion by laser at high speeds, it is desired that the rate of laser beam scanning is set to be not more than 1.65 mm/msec and, specifically, to lie in a range of 1.40 to 1.65 mm/msec depending on the laser output and the thermal decomposition start temperature of the laser beam-absorbing thermoplastic resin composition. Here, the rate of scanning (mm/msec) is calculated from the length of sealing (mm) found from the diameter of the mouth of the container and the laser application time (msec).

EXAMPLE

A cup type container and a formed lid of a dented shape were prepared as described below.

Container: From a resin sheet of a layer constitution of 450 μm-thick polypropylene (outer surface side of cup)/30 μm-thick adhesive layer/90 μm-thick EVOH (ethylene.vinyl alcohol copolymer resin)/30 μm-thick adhesive layer/400 μm-thick polypropylene (melting point: 160° C.) (inner surface side of cup), there was formed, by the vacuum forming method, a cup type container having a flange and the opening portion of an outer diameter of 80 mm and a capacity of 120 ml, the side wall thereof being inversely tapered to have a diameter that decreases upwards (a tapering angle of about 10°).

Formed lid: The carbon black was added in an amount of 1000 ppm to a polypropylene resin (melting point of 160° C.), and form which a dented lid of a thickness of 0.7 mm was formed by the injection forming.

The cup type container was filled with 100 g of water. By using a receiving plate that holds the container at the stack portion of the cup type container, cup type container and the formed lid were placed and fixed with the formed lid being pushed thereto such that the circumferential portion of the formed lid was placed on the flange portion of the cup type container. A load was applied from the upper side on the circumferential portion of the formed lid such that the contacting pressure was not less than 800 kPa on the contacting surfaces of the flange portion of the cup type container and the circumferential edge of the formed lid, and the contacting surface of the flange portion of the cup type container and the contacting surface of the circumferential portion of the formed lid were closely fitted together. Next, while rotating the turntable at 420 rpm, a laser beam was applied to a position of 475 mm relative to the center axis of the cup type container and the formed lid from the lower position at an application angle of 60° for 0.15 seconds, and the strength of the melt-adhered portion was evaluated.

The conditions of melt adhesion were as follows:
Laser oscillator: Semiconductor (GaAs) laser manufactured by Nittetsu Techno Research (max. laser output, 330 W); wavelength, 806±10 nm; laser output, 300 W; laser shape (cross section of beam) 1.5×4 mm.
Diameter of spot on where the laser beam is applied:
  φ 75 mm
Laser beam oscillation time: 0.15 sec (receiving plate rotating at 420 rpm; applied for 1.05 turns; scanning rate, 1.65 mm/msec)
Pressure on the contacting surfaces: about 800 kPa (contacting area, about 4 cm$^2$; load, 330 N)

The strength of melt adhesion was confirmed based on the JIS Z 0238 which stipulates the method of testing soft sealed packages and containers. Further, the bursting strength was judged based on that the container could withstand the inner pressure of 0.02 MPa that is the bursting strength required for the containers that are to be subjected to the retort sterilization in the above-mentioned testing method. It was confirmed that the strength of melt adhesion was maintained, the container did not burst despite the pressure in the container was elevated up to 0.1 MPa, and satisfactory sealing property had been possessed. Further, the resin had not been foamed from which it was learned that the temperature in the melt adhesion interface between the container and the lid had been raised by the irradiation with the laser beam to lie in a range of not lower than the melting point of the propylene but lower than the thermal decomposition start temperature thereof.

As Comparative Example, the shape of the laser beam was changed into 1.5×3 mm, and the laser beam was applied under the same conditions to evaluate. It was learned that the temperature of the resin had not been sufficiently elevated on the side of the cup type container, and the strength of melt adhesion and sealing had not been obtained as required.

To attain the strength of melt adhesion and sealing to a sufficient degree, the receiving plate had to be turned at 330 rpm (laser oscillation time, 0.19 sec; beam application for 1.05 turns; scanning rate, 1.30 mm/msec). Under this condition, however, the resin foamed along the circumferential portion of the formed lid.

INDUSTRIAL APPLICABILITY

The sealing method of the invention based on the melt adhesion by laser is capable of reliably melt adhere the container and the lid together in a short period of time. Besides, the melt adhesion is attained in a suitable heating time elevating the temperature to be not lower than the melting point of the thermoplastic resin and net lower than the heat decomposition start temperature thereof. The melt adhesion is reliably attained without causing the resin to foam. Therefore, the sealing method of the invention features excellent sealing performance as well as productivity, and can be favorably utilized for sealing products that are mass-produced.

DESCRIPTION OF REFERENCE NUMERALS

10 cup
13 flange portion
20 formed lid
21 circumferential portion

The invention claimed is:

1. A method of sealing a container and a lid by melt adhesion by a laser beam, wherein
   said container is a cup type container having a bottom portion, a body portion and a flange portion, said lid is a lid formed in a dented shape, said container comprising a thermoplastic resin that permits the laser beam to transmit therethrough, said lid comprising a resin composition of the thermoplastic resin containing a heat-generating substance that generates heat upon absorbing the laser beam;
   the method comprising applying the laser beam to a contacting surface of the flange portion and a circumferential portion of the lid from a lower side of the container in a state where the container and the lid are being pushed and closely contacted to each other by use of a pushing jig, wherein
   said laser beam is capable of applying a rectangular beam having a uniform intensity distribution,
   an upper-limit of temperature that is elevated by the application of the laser beam lies in a range of not lower than a melting point of said thermoplastic resin but lower than a thermal decomposition start temperature thereof in a melt adhesion interface between said container and said lid, and
   the temperature reaches said upper-limit in a heating time t (msec) represented by the following formula (1), $$t \text{ (msec)} = L/S \qquad (1)$$

wherein L is the length (mm) of the rectangular beam in the scanning direction, and S is the rate of laser scanning (mm/msec) of not higher than 1.65 mm/msec.

2. The sealing method according to claim 1, wherein said thermoplastic resin is any one of a styrene resin, an olefin resin or a polyester resin.

3. The sealing method according to claim 1, wherein the rate of laser scanning is 1.40 to 1.65 mm/msec.

\* \* \* \* \*